April 25, 1967     G. R. TAYLOR     3,316,138
METHOD OF PROCESSING CLUTCH PLATES
Filed Sept. 22, 1961     2 Sheets-Sheet 1

INVENTOR.
Garthwood R. Taylor
BY
His Attorney

United States Patent Office 3,316,138
Patented Apr. 25, 1967

3,316,138
METHOD OF PROCESSING CLUTCH PLATES
Garthwood R. Taylor, Dayton, Ohio, assignor to General Motors Corporation, Detroit, Mich., a corporation of Delaware
Filed Sept. 22, 1961, Ser. No. 140,010
3 Claims. (Cl. 156—267)

This invention relates to a clutch plate and is more particularly concerned with a method for making improved clutch plates.

One of the objects of the invention is to provide a method for improving the characteristics of a clutch plate utilizing porous facing materials.

In carrying out the above object, it is a further object of this invention to attain this desideratum by blanking the facing used on the plate to expose raw edges after impregnation thereof with a resin and thereby increase the porosity of the facing during the subsequent use.

Further objects and advantages of the present invention will be apparent from the following description, reference being had to the accompanying drawings wherein preferred embodiments of the present invention are clearly shown.

In Almen et al. Patent 2,733,797, assigned to the assignee of the present invention, a rather complete disclosure is set forth for producing a friction facing made from matted fibers coated and stiffened with a thermosetting resin wherein the facing so produced is carried by a metallic supporting plate. Clutch plates of this character are used extensively in automatic transmissions utilizing a fluid, such as oil, wherein packs of the plates are used in alternate relation as driving and driven members so that when pressure is applied to the pack, the plates compress and engage and drive the vehicle in which the transmission is used.

In said Almen patent, a rather exact procedure is set forth for the manufacture of the facing material wherein the facing material is a paper made from cellulose fibers with or without friction fortifying materials as desired and wherein the paper is produced by using conventional papermaking techniques to form a felted mat which, prior to impregnation is quite similar to blotting paper. This mat is blanked into annulae which are impregnated with a thermo-setting resin, for example, a phenolformaldehyde resin. The impregnated blanks are spun to centrifugally throw out excess resin and are then cured whereby a facing is formed which has a degree of porosity and wherein each fiber of the mat is protected by a coating of the thermo-setting resin. This permits the facing to allow a controlled flow of the transmission fluid therethrough so that as the plates in the clutch pack are engaged the transmission fluid is forced from between the plates by the pressure and will also be forced through the plates due to the porosity thereof. The porous material of the facings permits fluid flow therethrough whereby the transmission fluid or oil helps maintain the facings cool and prevents scorching during engagement or slipping action between adjacent facings. The porous nature of the facing is of considerable importance to the satisfactory operation of the clutch pack. It permits cooling action upon engagement and reduces and/or eliminates scorching and burning, improving smoothness of engagement and as a result, provides longer life of the facings.

Clutch packs of this general character have been highly successful and are used in the majority of the automotive vehicles produced in this country.

The present invention is directed to an improvement in the method of manufacturing of clutch plates and is specifically directed to an improvement in the production of the facings for clutch plates.

Figure 1:
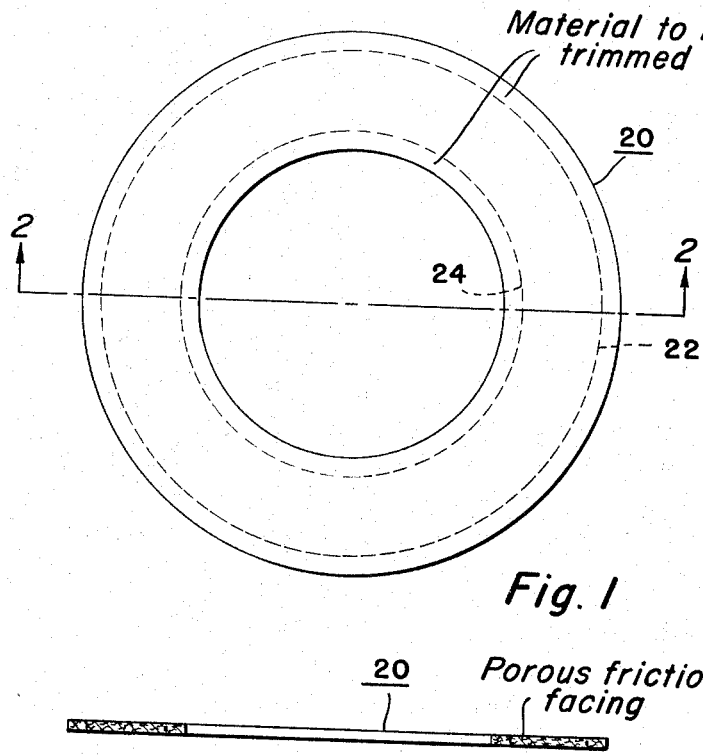
FIGURE 1 is a plan view of a clutch facing.
Figure 2:
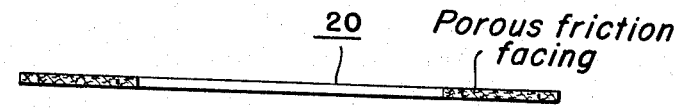
FIGURE 2 is a section taken through FIGURE 1.

Referring to the drawings, FIGURE 1 shows a facing for a clutch plate at 20 wherein the dotted line portions at 22 and 24 designate the ultimate dimensions desired. The facing 20, or as it is termed in the trade, the "cookie," is impregnated as set forth in the Almen patent referred to supra. Thereafter, the excess resin is spun off by placing the facings on an arbor and spinning the same at about, for example, 1050 r.p.m. for from 7 to 8 seconds. The facings are then immediately placed upon the surface of a flat surface, for example, a metal plate and in direct contact therewith and so that no overlapping occurs and are air dried without additional pressure at ambient temperatures for about three or four hours. Thereafter, a post cure is carried out at about 150° to 160° F. for 15 to 20 minutes. The drying of the facings is of great importance and if the facing material is not placed against the flat metal surface within about three minutes from the time the excess resin is spun off, the facing must be rejected. This drying step creates a substantially flat working surface free from fibrils and other extraneous surface imperfections whereby facings when used in a clutch plate are more uniform in their initial action and wear better. The drying step also limits the resin at the surface since evaporating the solvent tends to draw resin to the exposed surface. The exposed surface remains relatively rough to facilitate the subsequent bonding operation.

Figure 3:
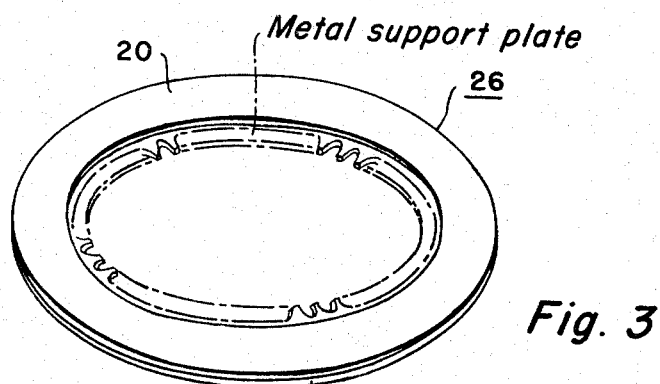
FIGURE 3 is one type of clutch plate showing the facing attached to a metal support in perspective.
Figure 4:
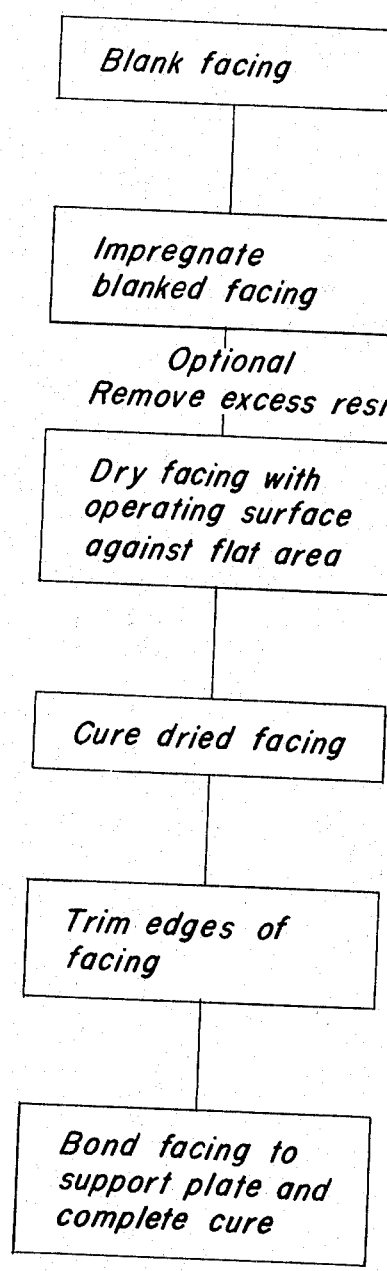
FIGURE 4 is a flow chart showing the steps of a method for producing an improved clutch plate set forth therein.

After the cure, the cookies 20 are blanked or trimmed to bring the final dimensions to those shown by dotted lines 22 and 24 in FIGURE 1. Thereafter, the trimmed cookie is bonded to the support plate 25 to form a clutch plate as shown at 26 in FIGURE 3. This bonding is generally carried out by smearing the metal plate 25 with a thin layer of resin cement and removing all excess resin. Thereafter, the cookies 20 are positioned with their rough surface against the metal plate and are placed under moderate and uniform pressure and the bonding cement is cured under suitable conditions. This step also completes the cure of the impregnating resin. The cookies may be positioned on one or both sides of the metal plates as required and the specific disposition thereof forms no part of this invention which is directed in its entirety to the two important steps set forth above, namely, to the drying and partial curing of the facing material against a flat closed operating surface whereby a smooth and uniform surface is obtained with controlled distribution of the resin and to the trimming of the cookie which exposes raw edges and eliminates possible closure of the surface pores of the facing by excess resin which may exude to the edge due to surface tension. This trim, therefore, creates a cookie that, when used in a clutch pack, passes the transmission fluid more readily therethrough whereby the plates using these facings are more uniform in action and maintain at lower operating temperatures due to the improved porosity and increased fluid flow therethrough which yields more uniform operating characteristics due to a more constant coefficient of friction throughout the useful life of the facing. In this connection, the surface porosity of the plate is always uniform since any closure of surface pores is quickly eliminated due to wear. However, since the edges are never contacted for frictional engagement with another portion of an adjacent plate, there is no opportunity for the edges to be conditioned in use and, thus, if the edge pores are closed, they remain closed throughout the use of the plate. By following the present procedure, these surface pores on the edges of the cookie are opened and made available to pass fluid prior to the time that the cookie is cemented to the supporting plate and, thus, the action of the completed plates is more uniform.

Actual experience has demonstrated that clutch plates wherein the facings are trimmed in accordance with the present invention are highly superior to clutch plates made by other processes wherein the edges are not trimmed and wherein the faces thereof are not maintained flat and uniform.

While specific paper material and specific resin impregnants and cement are disclosed in said Almen et al. patent, it is to be understood that this disclosure in no way limits the scope of my invention. The facings may be made from any porous material, fibrous, woven or sintered, wherein vegetable, mineral or metallic fibers are used alone or in combination as the felting material, and the impregnant may be any suitable thermo-setting cement. These variables form no part of the invention here which is specifically directed to obtaining a flat uniform surface, on the facing throughout its life and to the trimming of the edges thereof to present fluid flow channels that are substantially uniform from facing to facing.

While the embodiments of the present invention as herein disclosed constitute preferred forms, it is to be understood that other forms might be adopted.

What is claimed is as follows:

1. In a method for forming a friction facing adapted to be bonded on one of its sides to a metal supporting member for use in disk brake, clutch and the like wherein the other side of the facing operates as a friction surface in a fluid vehicle, the steps comprising; blanking the facing from a sheet of porous fibrous material, impregnating the fibers of said facing with a solution of thermosetting impregnant, removing any excess impregnant so as to retain the porous character of the facing, immediately placing the impregnated facing upon a flat surface with said friction side down, evaporating said solvent at ambient temperatures from the exposed surface of said facing which surface is ultimately to be bonded to said metal member thereby increasing the impregnant concentration at said exposed surface, said flat surface acting to prevent solvent escape from said friction surface, curing the impregnant in the facing to expose a raw peripheral edge while the facing is still on said flat surface, and then trimming the facing.

2. In a method of making a porous facing from paper-like material wherein the facing is adapted to be subsequently bonded on one of its sides to a metal supporting member and wherein the other side of said facing is adapted to be operated as a friction surface in a fluid vehicle, the steps comprising; blanking an annulus from a sheet of porous fibrous paper-like material wherein the size of the annulus is larger than the size of the annulus ultimately desired, impregnating the fibers of said annulus with a solution of a thermosetting resin, removing any excess resin so as to retain the porous character of the material immediately placing the impregnated facing on a flat operating surface with said friction surface down, evaporating said solvent at ambient temperatures from the exposed side of said facing which side is ultimately to be bonded to said metal member thereby increasing the concentration of said resin at said exposed surface, said flat surface acting to prevent solvent escape from said friction surface, curing the resin within the facings while said facing is still on said flat surface, and finally trimming the facing at both edges of the annulus for exposing a raw edge porosity thereon.

3. In a method for making a clutch plate adapted to operate in a fluid vehicle and consisting of a metal backing member having a porous facing bonded to at least one side thereof, the steps comprising; forming an oversize annulus from porous, fibrous paper-like materials, impregnating the oversize annulus in a thermosetting resin solution, removing any excess resin so as to retain the porous character of the material, immediately placing the impregnated annulus upon a flat surface leaving one side of the annulus exposed, evaporating said solvent at ambient temperatures from the exposed side thereby increasing the resin concentration at said side, said flat surface acting to prevent escape from said friction surface, curing the resin in the annulus while the annulus is still on said flat surface, trimming the inner and outer edges of the annulus to bring the same to the desired size and to expose raw edges thereon, and then bonding said facing to a metal support plate wherein the surface of the facing opposite to that which was against the flat surface is coextensively adhered to the support plate.

References Cited by the Examiner

UNITED STATES PATENTS

| | | | |
|---|---|---|---|
| 2,539,768 | 1/1951 | Anderson | 210—508 |
| 2,733,797 | 2/1956 | Almen et al. | 192—107 |
| 3,104,174 | 9/1963 | Harris | 117—4 |

ALEXANDER WYMAN, *Primary Examiner.*

W. A. POWELL, *Assistant Examiner.*